United States Patent
Kim et al.

(10) Patent No.: US 11,019,394 B2
(45) Date of Patent: *May 25, 2021

(54) AUTOMATED TRANSITION CLASSIFICATION FOR BINGE WATCHING OF CONTENT

(71) Applicant: DISH Network L.L.C., Englewood, CO (US)

(72) Inventors: Ilhyoung Kim, Englewood, CO (US); Pratik Divanji, Englewood, CO (US); Abhijit Y. Sharma, Englewood, CO (US); Swapnil Tilaye, Englewood, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/870,073

(22) Filed: May 8, 2020

(65) Prior Publication Data
US 2020/0267443 A1 Aug. 20, 2020

Related U.S. Application Data

(63) Continuation of application No. 16/109,755, filed on Aug. 23, 2018, now Pat. No. 10,694,244.

(51) Int. Cl.
*G06K 9/62* (2006.01)
*H04N 21/44* (2011.01)
*G06K 9/00* (2006.01)

(52) U.S. Cl.
CPC ... *H04N 21/44008* (2013.01); *G06K 9/00718* (2013.01); *G06K 9/627* (2013.01)

(58) Field of Classification Search
CPC ............. G06K 9/6257; H04N 5/23238; H04N 7/17318; H04N 21/44016;
(Continued)

(56) References Cited

U.S. PATENT DOCUMENTS 7,251,413 B2 7/2007 Dow et al.
7,809,154 B2 10/2010 Lienhart et al.
(Continued)

FOREIGN PATENT DOCUMENTS

WO 2016-133504 A1 8/2016
WO 2016-209400 A1 12/2016

OTHER PUBLICATIONS

Leychenko, Eugene, "Feature Teardown: Netflix's Skip Intro", Mar. 20, 2018, 6 pages. Retrieved from: https://medium.com/swlh/feature-teardown-netflixs-skip-intro-15cac114a136.
(Continued)

*Primary Examiner* — Phuoc H Doan
(74) *Attorney, Agent, or Firm* — Kilpatrick Townsend & Stockton LLP

(57) ABSTRACT

Novel techniques are described for automated transition classification for binge watching of content. For example, a number of frame images is extracted from a candidate segment time window of content. The frame images can automatically be classified by a trained machine learning model into segment and non-segment classifications, and the classification results can be represented by a two-dimensional (2D) image. The 2D image can be run through a multi-level convolutional conversion to output a set of output images, and a serialized representation of the output images can be run through a trained computational neural network to generate a transition array, from which a candidate transition time can be derived (indicating a precise time at which the content transitions to the classified segment).

20 Claims, 5 Drawing Sheets

(58) Field of Classification Search
CPC ......... H04N 21/47202; H04N 21/4665; H04N 21/4663; H04N 21/472; G06F 15/18; G06F 17/30817
USPC ............... 382/159; 725/53; 715/728, 764
See application file for complete search history.

(56) References Cited

U.S. PATENT DOCUMENTS

| | | | |
|---|---|---|---|
| 9,418,296 B1 | 8/2016 | Kansara | |
| 9,465,996 B1 | 10/2016 | Greene | |
| 9,558,784 B1 | 1/2017 | Gray et al. | |
| 9,843,759 B2 | 12/2017 | Jojic et al. | |
| 2006/0271947 A1 | 11/2006 | Lienhart et al. | |
| 2008/0240674 A1* | 10/2008 | Moore | H04N 5/85 386/279 |
| 2012/0089914 A1 | 4/2012 | Holt et al. | |
| 2013/0132382 A1 | 5/2013 | Kuznetsov et al. | |
| 2016/0173941 A1 | 6/2016 | Gilson et al. | |
| 2017/0164053 A1 | 6/2017 | Jaffe et al. | |
| 2017/0353519 A1 | 12/2017 | McLeod et al. | |
| 2019/0373322 A1* | 12/2019 | Rojas-Echenique | G06N 3/0454 |

OTHER PUBLICATIONS

Netflix, "How can I prevent Netflix from auto-playing episodes?", Mar. 20, 2018, 2 pages. Retrieved from: https://help.netflix.com/en/node/2102.

Reddit, "Netflix needs a way to skip TV show openings," Mar. 20, 2018, 4 pages. Retrieved from: https://www.reddit.com/r/netflix/comments/5pe8kh/netflix_needs_a_way_to_skip_tov_show_openings_all/.

Kiani Vahid et al., "Flexible soccer video summarization in compressed domain," ICCKE 2013, IEEE, Oct. 31, 2013, pp. 213-218, XP032531170, DOI: 10.1109/ICCKE.2013.6682798 (retrieved on Dec. 11, 2013) Section III.

International Search Report and Written Opinion for PCT/US2019/045383 dated Nov. 7, 2019, all pages.

* cited by examiner

AUTOMATED TRANSITION CLASSIFICATION FOR BINGE WATCHING OF CONTENT

CROSS REFERENCE TO RELATED APPLICATIONS

This application is a continuation of U.S. patent application Ser. No. 16/109,755, filed Aug. 23, 2018, the full disclosure of which is incorporated herein by reference.

FIELD

This invention relates generally to automated image classification, and, more particularly, to automated transition classification for binge watching of content.

BACKGROUND

In recent years, on-demand content, including television programming and other episodic media content offered by over-the-top (OTT) and other media sources has become increasingly available to consumers. In the wake of this availability, consumers are increasingly watching multiple episodes of such episodic programming in rapid succession; a type of media interaction referred to as binge watching. When binge watching programming, consumers often desire to watch only the portion of the programming providing new content for the present episode (referred to herein as the "subject" portion or portions of the program), and may be frustrated by having to watch other portions of the programming, such as opening credits, ending credits, scenes from the last episode provided at the start of a present episode, scenes from the next episode provided at the end of a present episode, etc. (referred to herein as the "non-subject" portion or portions of the program).

Content playback interfaces (e.g., television receivers, and the like, providing OTT streaming episodic media) do not tend to provide an automated approach to finding transition points in programming between the subject and non-subject portions of a program. For example, content playback interfaces providing OTT media tend not to include technology to automatically identify the transition time at which end credits begin rolling. Identifying such a transition time can appreciably improve a consumer's binge watching experience, for example, by facilitating the consumer being able to jump to the next episode as soon as the current episode ends (i.e., without having to wait for the end credits to roll, or without requiring other navigation, such as fast-forwarding, or navigating out to a menu screen).

Some current approaches to identifying transition times, such as an end credit start time, use crowdsourcing. With such approaches, one or more human users can manually identify the transition time and can submit the identified time to a system. The system can then record the time as the transition time (or can process multiple received candidate times, and use a statistical or other technique to determine an appropriate transition time). Such approaches can be limited in a number of ways. For example, implementations relying on multiple sources of feedback may not obtain sufficient amounts of feedback quickly enough to be useful in many instances (e.g., for new or unpopular television programs). Further, the accuracy of such approaches can be subject to human error (e.g., in identifying timing, in data entry, etc.), to fuzziness and unpredictability in the turnout and/or accuracy of human users, to wait times for crowd responses, etc. Some such approaches can also depend on offering sufficient incentives to obtain accurate, timely results.

BRIEF SUMMARY

Among other things, embodiments provide novel systems and methods for automated transition classification for binge watching of content. For example, a number of frame images is extracted from a candidate segment time window (e.g., a time window during which content is likely to transition between not being part of a type of segment to being part of the type of segment, such as transitioning to an ending credits segment). The frame images can automatically be classified by a trained machine learning model into segment and non-segment classifications, and the classification results can be represented by a two-dimensional (2D) image. The 2D image can be run through a multi-level convolutional conversion to output a set of output images, and a serialized representation of the output images can be run through a trained computational neural network to generate a transition array, from which a candidate transition time can be derived (indicating a precise time at which the content transitions to the classified segment).

According to one set of embodiments, a method for automated transition classification of media programming content is provided. The method includes: extracting N frame images at a sampling rate over an identified candidate segment time window of the media programming content; associating each of the N frame images automatically with a respective element of a 1-by-N input classification array, each element of the input classification array comprising an element value indicating a result of automatically classifying the associated frame image into one of a plurality of predetermined classifications, the plurality of predetermined classifications comprising at least a first classification corresponding to the frame image being part of a classified segment, and a second classification corresponding to the frame image not being part of the classified segment; converting the input classification array automatically into a two-dimensional input classification image having an input resolution corresponding to N, and a color depth corresponding to the plurality of predetermined classifications, such that N input pixel values of the input classification image correspond to the N element values of the classification array; computing a plurality of output classification images automatically as a function of running the input classification image automatically through a multi-level convolutional conversion, the plurality of output classification images having a total of M output pixel values, where M is greater than N; serializing the M output pixel values automatically to a 1-by-M output classification array, such that M element values of the output classification array correspond to the M output pixel values of the plurality of output classification images; computing a 1-by-N transition array automatically as a function of running the output classification array through an computational neural network trained to compute each of N element values of the transition array as a function of the M element values of the output classification array; and outputting a candidate transition time as a function of the transition array, the candidate transition time corresponding to a temporal location at which the media programming content transitions between not being part of the classified segment and being part of the classified segment.

According to another set of embodiments, a system is provided for automated transition classification of media programming content. The system includes: an image extraction controller comprising a video data input and a frame image output, the frame image output generated by extracting N frame images from the video data input at a sampling rate over an identified candidate segment time window; an image classification controller having a first machine learning model stored thereon, and coupled with the image extraction controller to output a 1-by-N input classification array, the input classification array computed as a function of applying the first machine learning model to the N frame images by associating each of the N frame images with a respective element of the input classification array, such that each element of the input classification array comprises an element value indicating one of a plurality of predetermined classifications comprising a first classification corresponding to the frame image being part of a classified segment, and a second classification corresponding to the frame image not being part of the classified segment; and a transition frame identification controller having a second machine learning model stored thereon, and coupled with the image classification controller to output a candidate transition time according to a 1-by-N transition array, the candidate transition time corresponding to a temporal location at which the video data transitions between not being part of the classified segment and being part of the classified segment. The transition array is computed as a function of applying the second machine learning model to the input classification array by: converting the input classification array into a two-dimensional input classification image having an input resolution corresponding to N and a color depth corresponding to the plurality of predetermined classifications, such that N input pixel values of the input classification image correspond to the N element values of the classification array; computing a plurality of output classification images automatically as a function of running the input classification image automatically through a multi-level convolutional conversion, the plurality of output classification images having a total of M output pixel values, where M is greater than N; and computing the 1-by-N transition array as a function of applying an computational neural network to the M output pixel values. Some such embodiments further include a binge viewing controller to generate a playback navigation control, responsive to a user interface command, to skip at least a portion of the classified segment in accordance with the candidate transition time.

According to another set of embodiments, a non-transient, machine-readable medium is provided. The medium is coupled with one or more processors and has, stored thereon, instructions, which, when executed, cause the one or more processors to perform steps comprising: extracting N frame images at a sampling rate over an identified candidate segment time window of the media programming content; associating each of the N frame images with a respective element of a 1-by-N input classification array, each element of the input classification array comprising an element value indicating a result of automatically classifying the associated frame image into one of a plurality of predetermined classifications, the plurality of predetermined classifications comprising at least a first classification corresponding to the frame image being part of a classified segment, and a second classification corresponding to the frame image not being part of the classified segment; converting the input classification array into a two-dimensional input classification image having an input resolution corresponding to N, and a color depth corresponding to the plurality of predetermined classifications, such that N input pixel values of the input classification image correspond to the N element values of the classification array; computing a plurality of output classification images as a function of running the input classification image automatically through a multi-level convolutional conversion, the plurality of output classification images having a total of M output pixel values, where M is greater than N; serializing the M output pixel values to a 1-by-M output classification array, such that M element values of the output classification array correspond to the M output pixel values of the plurality of output classification images; computing a 1-by-N transition array as a function of running the output classification array through an computational neural network trained to compute each of N element values of the transition array as a function of the M element values of the output classification array; and outputting a candidate transition time as a function of the transition array, the transition time corresponding to a temporal location at which the media programming content transitions between not being part of the classified segment and being part of the classified segment.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label (e.g., a lower-case letter) that distinguishes among the similar components. If only the first reference label is used in the specification, the description is applicable to any one of the similar components having the same first reference label irrespective of the second reference label.

DETAILED DESCRIPTION

Embodiments of the disclosed technology will become clearer when reviewed in connection with the description of the figures herein below. In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
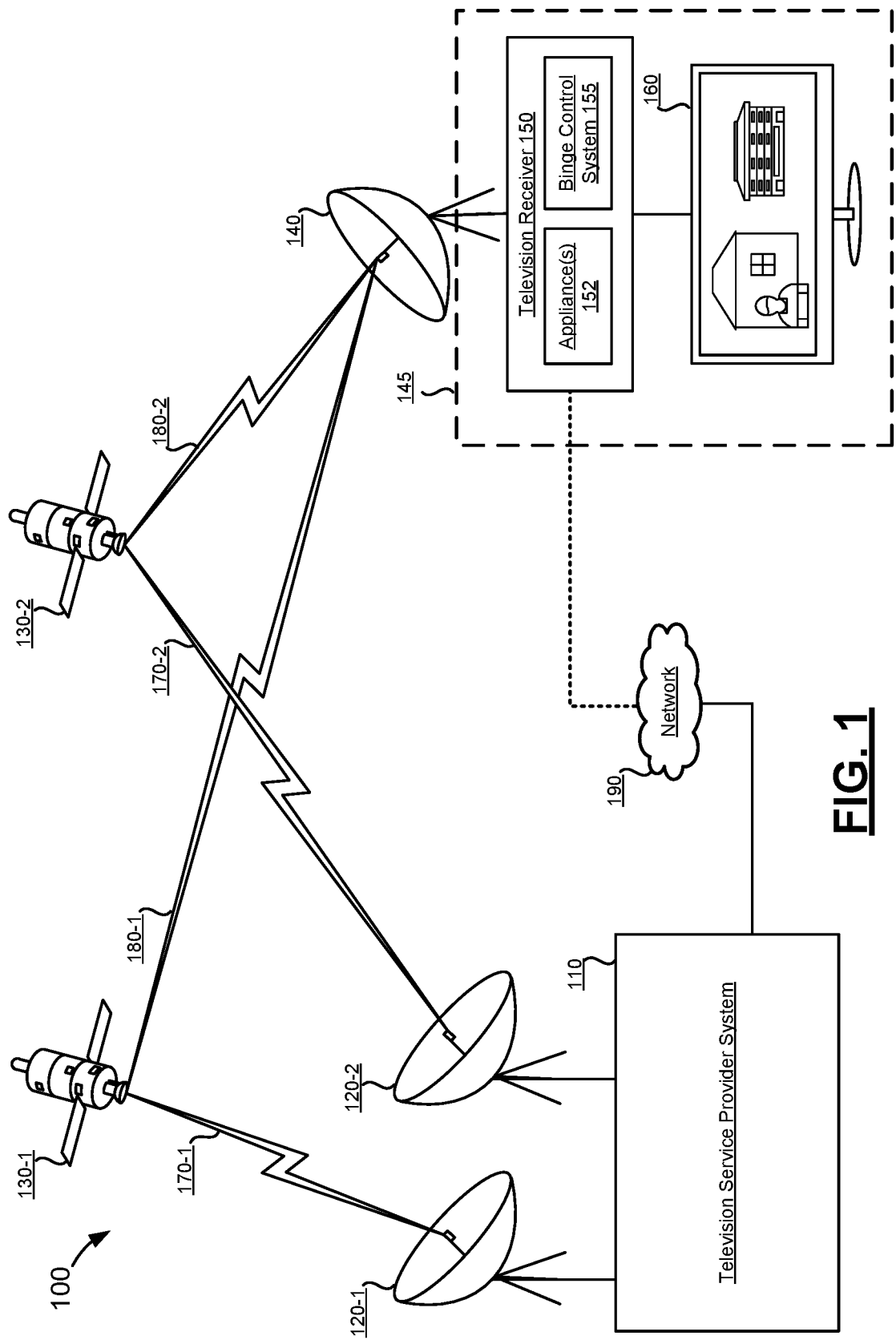
FIG. 1 shows an illustrative satellite television distribution system as context for various embodiments described herein.

FIG. 1 shows an illustrative satellite television distribution system 100 as context for various embodiments described herein. Satellite television distribution system 100 may include: television service provider system 110, satellite transmitter equipment 120, satellites 130, satellite dish 140, television receiver 150, and display device 160. Alternate embodiments of satellite television distribution system 100 may include fewer or greater numbers of components. While only one satellite dish 140, television receiver 150, and display device 160 (collectively referred to as "user equipment") are illustrated, it should be understood that multiple (e.g., tens, thousands, millions) instances of user equipment may receive television signals from television service provider system 110 via satellites 130. Further, while embodiments are described in particular context of a satellite television distribution system 100, techniques described herein can also be implemented in context of other television and media distribution architectures and infrastructures, such as cable television distribution networks.

The user equipment is shown disposed at a subscriber premises 145. The subscriber premises 145 can be a subscriber's home, office, or any suitable location associated with a particular subscriber at which to locate the subscriber's satellite dish 140 and television receiver 150. As one example, the satellite dish 140 is mounted to an exterior location (e.g., wall, roof, etc.) of the subscriber's home, and cables run from the satellite dish 140 to the television receiver 150, which is located inside the subscriber's home; and one or more display devices 160 (e.g., televisions) is coupled with the television receiver 150 and located in the subscriber's home.

Television service provider system 110 and satellite transmitter equipment 120 may be operated by a television service provider. A television service provider may distribute television channels, on-demand programming, programming information, and/or other content/services to users. Television service provider system 110 may receive feeds of one or more television channels from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams. Satellite transmitter equipment 120 (120-1, 120-2) may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically, to communicate with satellites 130. Such multiple instances of satellite transmitting equipment 120 may communicate with the same or with different satellites 130. Different television channels may be transmitted to satellites 130 from different instances of transmitting equipment 120. For instance, a different satellite dish of satellite transmitter equipment 120 may be used for communication with satellites 130 in different orbital slots.

Satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from transponder streams 180. Satellites 130 may be in geosynchronous orbit. Each of the transponder streams transmitted by satellites 130 may contain multiple television channels transmitted as packetized data. For example, a single transponder stream may be a serial digital packet stream containing multiple television channels. Therefore, packets for multiple television channels may be interspersed.

Multiple satellites 130 may be used to relay television channels from television service provider system 110 to satellite dish 140. Different television channels may be carried using different satellites 130. Different television channels may also be carried using different transponders of the same satellite 130; thus, such television channels may be transmitted at different frequencies and/or different frequency ranges. As an example, a first and second television channel may be relayed via a first transponder of satellite 130-1. A third, fourth, and fifth television channel may be relayed via a different satellite or a different transponder of the same satellite relaying a transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment. Each transponder stream may be able to carry a finite amount of data. As such, the number of television channels that can be included in a particular transponder stream may be at least partially dependent on the resolution of the video of the television channel. For example, a transponder stream may be able to carry seven or eight television channels at a high resolution, but may be able to carry dozens, fifty, a hundred, two hundred, or some other number of television channels at reduced resolutions.

Satellite dish 140 may be a piece of user equipment that is used to receive transponder streams from one or more satellites, such as satellites 130. Satellite dish 140 may be provided to a subscriber for use on a subscription basis to receive television channels provided by the television service provider system 110, satellite transmitter equipment 120, and/or satellites 130. Satellite dish 140, which may include one or more low noise blocks (LNBs), may be configured to receive transponder streams from multiple satellites and/or multiple transponders of the same satellite. Satellite dish 140 may be configured to receive television channels via transponder streams on multiple frequencies. Based on the characteristics of television receiver 150 and/or satellite dish 140, it may only be possible to capture transponder streams from a limited number of transponders concurrently. For example, a tuner of television receiver 150 may only be able to tune to a single transponder stream from a transponder of a single satellite at a given time. The tuner can then be re-tuned to another transponder of the same or a different satellite. A television receiver 150 having multiple tuners may allow for multiple transponder streams to be received at the same time.

In communication with satellite dish 140 may be one or more television receivers 150. Television receivers 150 may be configured to decode signals received from satellites 130 via satellite dish 140 for output and presentation via a display device, such as display device 160. A television receiver may be incorporated as part of a television or may be part of a separate device, commonly referred to as a set-top box (STB). Television receiver 150 may decode signals received via satellite dish 140 and provide an output to display device 160. A television receiver is defined to include set-top boxes (STBs) and also circuitry having similar functionality that may be incorporated with another device. For instance, circuitry similar to that of a television receiver may be incorporated as part of a television, and/or such circuitry can be implemented in multiple appliances. While FIG. 1 illustrates an embodiment of television receiver 150 as separate from display device 160, it should be understood that, in other embodiments, similar functions may be performed by a television receiver integrated with display device 160.

As shown, the television receiver 150 can be implemented as one or more appliances 152. For example, the television receiver 150 can include a STB and an over-the-top (OTT) appliance, a master STB in communication with distributed slave STBs, etc. Though not shown, some implementations of the television receiver 150 include a modem, or the like. For example, the illustrated satellite network can be used to provide both televisions services and other communications services, such as Internet services. In such implementations, the network 190 can be implemented by the satellite communications network. For example, the output of the modem can be coupled (e.g., via a splitter) to both television receiver 150 components (e.g., a STB) and a local area network (LAN) router, or the like. The television receiver 150 can also include a binge control system 211, which is described in more detail below.

Display device 160 may be used to present video and/or audio decoded and output by television receiver 150. Television receiver 150 may also output a display of one or more interfaces to display device 160, such as an electronic programming guide (EPG). In many embodiments, display device 160 is a television. Display device 160 may also be a monitor, computer, or some other device configured to display video and, possibly, play audio.

Uplink signal 170-1 represents a signal between satellite transmitter equipment 120 and satellite 130-1. Uplink signal 170-2 represents a signal between satellite transmitter equipment 120 and satellite 130-2. Each of uplink signals 170 may contain streams of one or more different television channels. For example, uplink signal 170-1 may contain a first group of television channels, while uplink signal 170-2 contains a second group of television channels. Each of these television channels may be scrambled such that unauthorized persons are prevented from accessing the television channels.

Transponder stream 180-1 represents a transponder stream signal between satellite 130-1 and satellite dish 140. Transponder stream 180-2 represents a transponder stream signal between satellite 130-2 and satellite dish 140. Each of transponder streams 180 may contain one or more different television channels, which may be at least partially scrambled. For example, transponder stream 180-1 may be a first transponder stream containing a first group of television channels, while transponder stream 180-2 may be a second transponder stream containing a different group of television channels. When a television channel is received as part of a transponder stream and is decoded and output to display device 160 (rather than first storing the television channel to a storage medium as part of DVR functionality then later outputting the television channel from the storage medium), the television channel may be considered to be viewed "live."

FIG. 1 illustrates transponder stream 180-1 and transponder stream 180-2 being received by satellite dish 140 and distributed to television receiver 150. For a first group of television channels, satellite dish 140 may receive transponder stream 180-1 and for a second group of channels, transponder stream 180-2 may be received. Television receiver 150 may decode the received transponder streams. As such, depending on which television channels are desired to be presented or stored, various transponder streams from various satellites may be received, descrambled, and decoded by television receiver 150.

Network 190 may serve as a secondary communication channel between television service provider system 110 and television receiver 150. However, in many instances, television receiver 150 may be disconnected from network 190 (for reasons such as because television receiver 150 is not configured to connect to network 190 or a subscriber does not desire or cannot connect to network 190). As such, the connection between network 190 and television receiver 150 is represented by a dotted line. Via such a secondary communication channel, bidirectional exchange of data may occur. As such, data may be transmitted to television service provider system 110 from television receiver 150 via network 190. Data may also be transmitted from television service provider system 110 to television receiver 150 via network 190. Network 190 may be the Internet. While audio and video services may be provided to television receiver 150 via satellites 130, feedback from television receiver 150 to television service provider system 110 may be transmitted via network 190.

Figure 2:
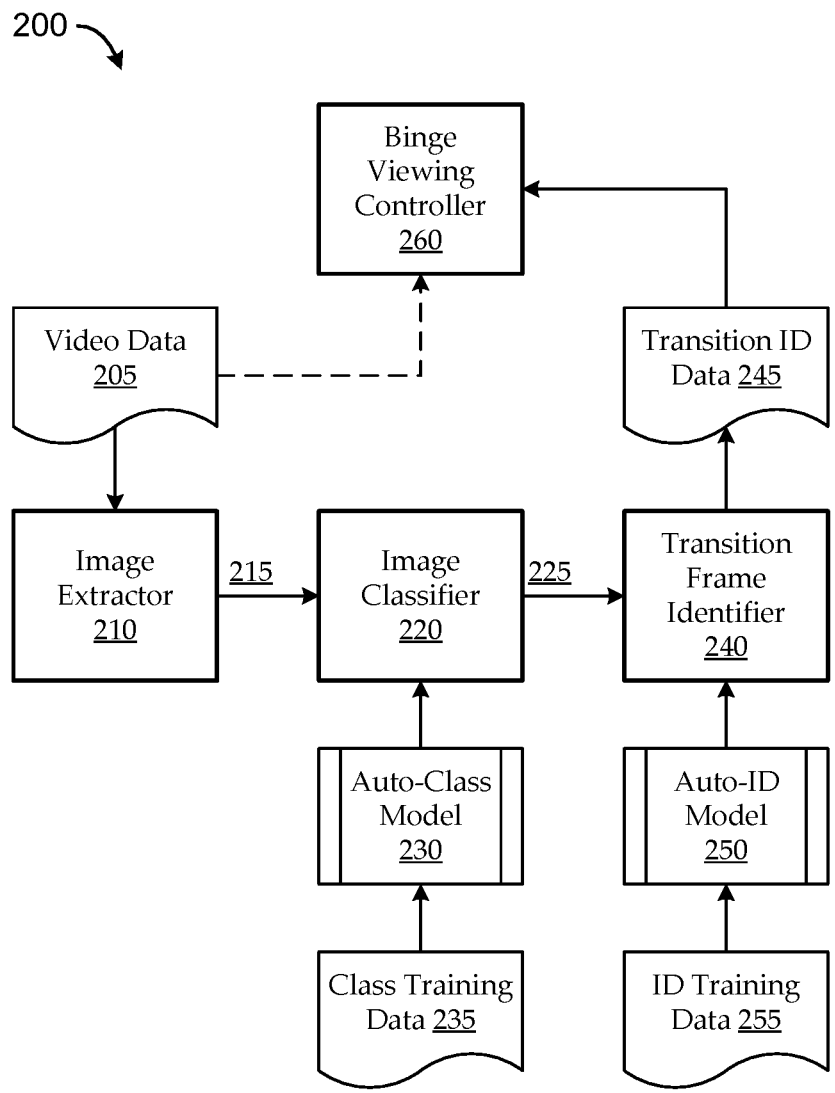
FIG. 2 shows a block diagram of an illustrative system for automated transition classification of media programming content.

FIG. 2 shows a block diagram of an illustrative system 200 for automated transition classification of media programming content. The system 200 can be an implementation of the binge control system 155 of FIG. 1. For example, the system 200 can be implemented as part of a television receiver, or in an appliance that is coupled with a television receiver. In other embodiments, some or all of the system 200 is implemented as part of the television service provider system 110. For example, media programming content is automatically processed to identify transition times for one or more types of classified segment, and the transition times are stored by a component of the television service provider system 110. In such embodiments, the transition times can be distributed to binge control systems 155 of subscriber-side television receivers as needed, or in any other suitable manner.

As illustrated, embodiments of the system 200 can include an image extraction controller 210, an image classification controller 220, and a transition frame identification controller 240. Some embodiments can further include a binge viewing controller 260, as described below. Embodiments of the image extraction controller 210 can include a video data input 205 and a frame image output 215. The frame image output 215 can be generated by extracting N frame images from the video data input 205 at a sampling rate over an identified candidate segment time window. In some implementations, the identified candidate segment time window is J minutes long; and the sampling rate is K samples per second, such that N=J*K*60. As an example, the identified candidate segment time window is ten minutes long; and the sampling rate is one sample per second, such that N is 600 frame images. In some implementations, the sampling rate is irregular. For example, the sampling rate may be set to extract 600 samples over a ten-minute window, but the time from one sample to the next may or may not by one second in every instance.

Embodiments of the image classification controller 220 can have a first machine learning model, a machine-implemented auto-classification model 230, stored thereon. The auto-classification model 230 can be implemented as any suitable machine learning model trained (according to classification training data 235) to discriminate between predetermined classifications of frame images, as described herein. In some embodiments, the auto-classification model 230 is trained as a function of the classification training data 235 having a large number of training frame images associated with the classified segment, and a large number of training frame images associated with a segment that is not the classified segment. For example, a large number of credit frames (e.g., frames that are part of the end credits of one or more programs) and non-credit frames can be used to train the machine learning model to recognize differences between credit and non-credit frames. In some such implementations, principle component analysis, or the like, is used by a machine to automatically identify which parameters are most useful in discriminating between credit and non-credit frames (or any other suitable classified segment of interest). In some implementations, the auto-classification model 230 can be trained to classify images according to only one, or more than one, set of predetermined classifications corresponding to only one, or more than one type of classified segment (e.g., ending credits, opening credits, etc.). For example, implementations can be trained to identify frames that are part of ending credits of programs, opening credits of programs, recaps of episodes (e.g., a segment at the beginning of an episode that includes clips from one or more previous episodes), previews of episodes (e.g., a segment at the end of an episode that includes clips from one or more upcoming episodes), supplemental content (e.g., an outtake segment at the end of an episode), etc.

The image classification controller 220 can be coupled with the image extraction controller 210 to output a one-dimensional input classification array 225 of N elements (i.e., a 1-by-N input classification array). The input classification array 225 can be computed as a function of applying the auto-classification model 230 to the frame image output 215 (the N frame images) by associating each of the N frame images with a respective element of the input classification array 225. Each element of the input classification array 225 has an element value indicating one of multiple predetermined classifications. In some implementations, each element of the input classification array has either a first element value or a second element value (e.g., '1' or '0'), the first element value indicating that the associated frame image is part of the classified segment, and the second element value indicating that the associated frame image is not part of the classified segment. For example, a '1' can indicate that the frame image is classified as an credit frame, and a '0' can indicate that the frame image is classified as a non-credit frame. In other implementations, more predetermined classifications can be used.

Embodiments of the transition frame identification controller 240 can have a second machine learning model, a machine-implemented auto-identification model 250, stored thereon. The auto-identification model 250 can include a multi-level convolutional conversion and a computational neural network, which are coupled with the image classification controller 220 to output transition identification data 245 (e.g., a candidate transition time) according to the input classification array 225. As described herein, the transition frame identification controller 240 can convert the input classification array 225 into a two-dimensional input classification image, run the input classification image through the multi-level convolutional conversion to generate a number of output classification images, and run the output classification images through the computational neural network to generate the transition identification data 245. For example, the transition identification data 245 can include a computed candidate transition time that corresponds to a temporal location at which the video data input 205 transitions between not being part of the classified segment and being part of the classified segment (e.g., the time at which the ending credits begin, the time at which the opening credits end, or the like).

Figure 3:
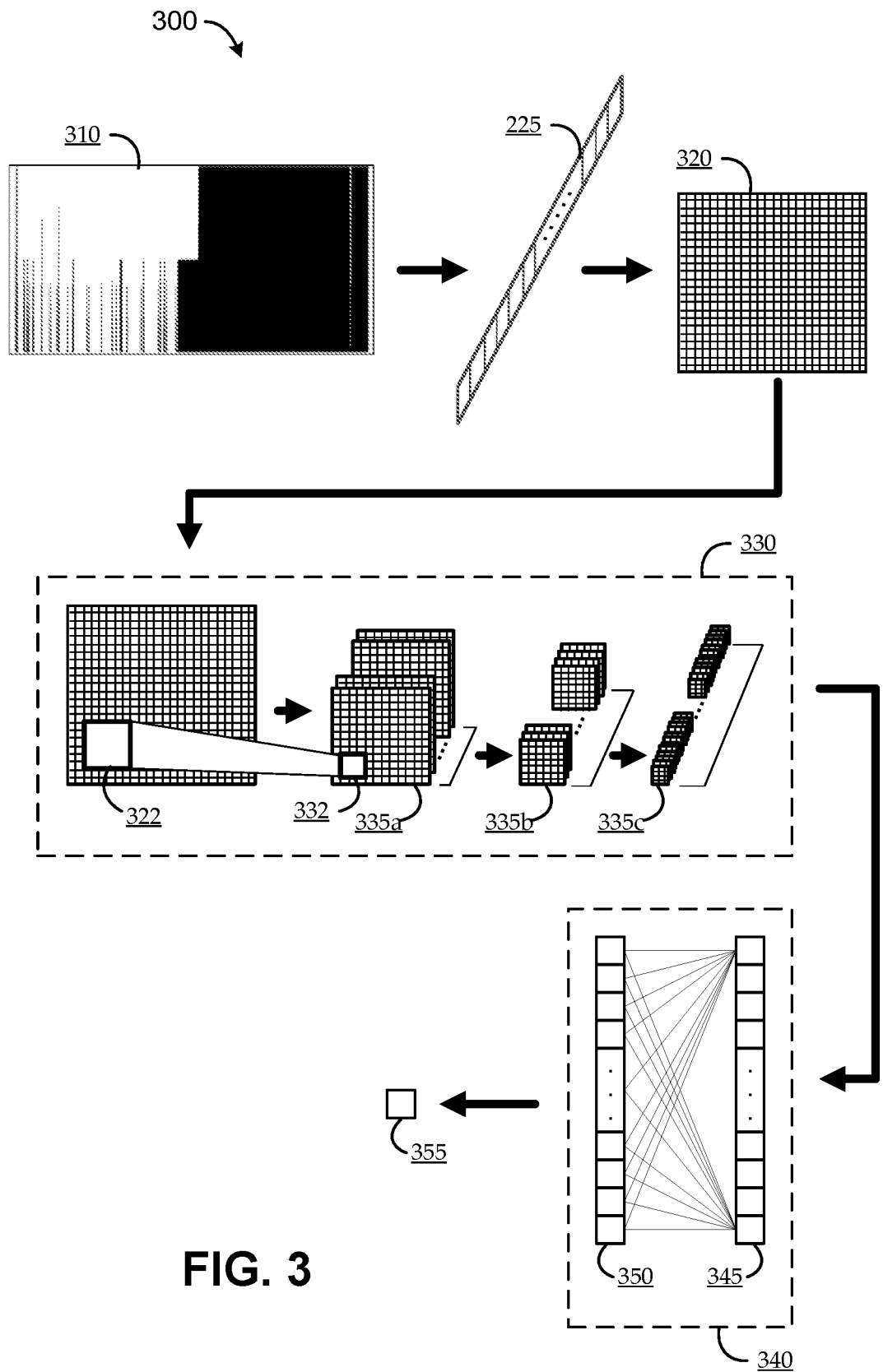
FIG. 3 shows a data flow diagram for an illustrative implementation of embodiments of the image classification controller and the transition frame identification controller of FIG. 2.

FIG. 3 shows a data flow diagram 300 for an illustrative implementation of embodiments of the image classification controller 220 and the transition frame identification controller 240 of FIG. 2. Embodiments can begin with a classification model output 310 that indicates a set of image frame classifications generated by the image classification controller 220 according to the auto-classification model 230. The illustrated classification model output 310 is represented as a graph having the image frames extracted by the image extraction controller 210 along the x-axis, and three classification levels on the y-axis: '0' indicates classification as a non-credit frame, '1' indicates classification as a credit frame with credits overlaid on other programming in the background, and '2' indicates classification as a credit frame with credits overlaid on a single-color (e.g., black) background. For example, the graph may include N values, each being a '0', '1', or '2'. At a high level, the classification model output 310 appears to indicate that the credits begin to roll about halfway into the candidate time window, while the program continues to play in the background; and, shortly thereafter, the credits continue to roll with a black background. However, as illustrated, the auto-classification model 230 may generate a number of incorrect classifications. For example, over the first half of the candidate time window (e.g., the last ten minutes of a program from which the frame images were extracted), the classification model output 310 indicates a number of '1' and '2' results, corresponding to the auto-classification model 230 automatically classifying image frames as credit frames prior to what appears to be the actual start of the credits. Indeed, if the auto-classification model 230 were perfect, there may be little or no need for the auto-identification model 250.

The classification model output 310 can be mapped to the input classification array 225, as shown. For example, the N results shown in the classification model output 310 can be mapped sequentially to corresponding elements of the input classification array 225. In the illustrative case, each element of the input classification array 225 can be a '0', '1', or '2'; corresponding to a point in the graph of the classification model output 310. As described above, the input classification array 225 can be output from the auto-classification model 230 to the auto-identification model 250.

Embodiments can convert the input classification array 225 into a two-dimensional input classification image 320. The input classification image 320 can have an input resolution corresponding to N, and a color depth corresponding to the predetermined classifications. For example, N input pixel values of the input classification image 320 can correspond to the N element values of the input classification array 225. In some implementations, converting the input classification array 225 into the two-dimensional input classification image 320 includes mapping each of the N element values of the input classification array 225 to a respective one of the N input pixel values of the input classification image 320, such that the input classification image has a resolution of B pixels by C pixels, where B*C=N. As an example, 600 extracted frame images result in 600 classifications, which result in 600 element values in the input classification array 225; and the 600 element values in the input classification array 225 can be converted into a two-dimensional image of 24-by-25 pixels (24*25=600 pixels). Each of the 600 pixels of the input classification image 320 can be colored according to its corresponding element of the input classification array 225. In one implementation, each pixel is one of three colors (e.g., black, grey, or white) corresponding to the three possible classification values, '0', '1', and '2' in the illustrated case. In another implementation, each pixel is one of two colors (e.g., black or white) corresponding to groupings of the three possible classification values (e.g., '0' is encoded as black, corresponding to no credit frames; and both '1' and '2' are encoded as white, both corresponding to different types of credit frames).

As described above, embodiments of the transition frame identification controller 240 can compute output classification images 335 as a function of running the input classification image 320 through a multi-level convolutional conversion 330. The illustrated multi-level convolutional conversion 330 includes three levels. In a first level, multiple convolutional filters are applied to the input classification image 320 to generate a first set of output images 335a. For example, each convolutional filter effectively enhances some characteristic of the input classification image 320 to generate a respective one of the first set of output images 335a. Each of the first set of output images 335a has lower resolution than the resolution of the input classification image 320 (e.g., indicated by the transition between pixels 322 to pixels 332). In the illustrated case, the input classification image 320 is a single two-dimensional image of 24-by-25 pixels, and the first set of output images 335a includes thirty-two two-dimensional images of 12-by-13 pixels each.

Each level of the multi-level convolutional conversion 330 takes the output images 335 from the previous level as its input images, and computes its own output images 335 by applying a set of convolutional filters to its input images. Each level of the convolutional conversion generates a larger number of output images 335 than those computed in the preceding level, and each of the output images 335 has a smaller resolution than the output images 335 computed in the preceding level. Each level can also apply the same or different convolutional filters to generate its output images 335. The resulting output classification images can have a total of M output pixel values, where M is greater than N (i.e., M and N are positive integers, and M>N). The final level of the multi-level convolutional conversion 330 can output some integer number (D) of output classification images, each having a resolution of E pixels by F pixels, such that D*E*F=M.

In the illustrated case, the second level of the multi-level convolutional conversion 330 computes a second set of output images 335b as a function of the first set of output images 335a, so that the second set of output images 335b includes sixty-four two-dimensional images of 6-by-7 pixels each. The third level of the multi-level convolutional conversion 330 computes a third set of output images 335c as a function of the second set of output images 335b, so that the third set of output images 335c includes 128 two-dimensional images of 3-by-4 pixels each. Accordingly, the third set of output images 335c generated by the third (final) level of the multi-level convolutional conversion 330 includes 1,563 output pixel values (128*3*4=1,563).

Embodiments can serialize the M (e.g., 1,563) output pixel values to a one-dimensional (1-by-M) output classification array 345. The serializing can be performed in such a manner that M element values of the output classification array 345 correspond to the M output pixel values of the final (e.g., third) set of output classification images 335. As an example, each pixel of each output classification image 335 is mapped, according to a predefined sequence, to a corresponding element of the output classification array 345.

Embodiments can run the output classification array 345 through a computational neural network 340 to compute a transition array 350. The computational neural network 340 is trained to compute each of N element values of the transition array 350 as a function of the M element values of the output classification array 345. Embodiments of the computational neural network 340 are trained to compute an M-by-N set of weightings. According to such embodiments, computing the transition array 350 includes applying the M-by-N weightings to the 1-by-M output classification array 345 to compute the 1-by-N transition array 350. For example, the output classification array 345 can be represented as a 1-by-M matrix, the M-by-N weightings can be represented as an M-by-N matrix, and multiplying the 1-by-M matrix by the M-by-N matrix can yield a 1-by-N matrix corresponding to (e.g., equaling, or from which to derive) the 1-by-N transition array 350. For example, the computational neural network 340 can be trained with a large number of sample sets of images corresponding to transition times at which programs transition between not being part of the classified segment and being part of the classified segment. In some implementations, the training data for the computational neural network 340 (ID training data 255 of FIG. 2) can include large numbers of classification model output 310 graph samples, along with feedback indicating appropriate transition times for each of those graph samples.

Embodiments can output a candidate transition time (represented as block 355) as a function of the transition array 350. The candidate transition time 355 corresponds to a temporal location at which the media programming content transitions between not being part of the classified segment and being part of the classified segment. In some implementations, the computational neural network 340 is configured to output the transition array 350, such that each of the N element values of the transition array 350 corresponds to a respective one of the N frame images (e.g., from the frame image output 215). In some cases, the computational neural network 340 includes further processing, such that only one of the N element values of the transition array 350 has a first transition element value (e.g., '1') indicating a transition frame; and each of the other (i.e., N−1) element values of the transition array has a second transition element value (e.g., '0') indicating a non-transition frame. In such implementations, outputting the candidate transition time 355 as a function of the transition array 350 includes identifying the one frame image of the N frame images as corresponding to the one of the N element values of the transition array 350 having the first transition element value. In some implementations, outputting the candidate transition time 355 further includes identifying a temporal location by mapping the identified one frame image to the temporal location in the media programming content. For example, the identified frame image can correspond to a particular time stamp that is a number of tenths of a second from the start of the program (or any other suitable temporal measure).

In general, the data flow diagram 300 converts video data image classification results into a two-dimensional representation (an input classification image 320), runs the input classification image 320 through a multi-level convolutional conversion 330 to output a set of output images 355, runs a serialized representation of the output images 355 (an output classification array 345) through a computational neural network 340 to generate a transition array 350, and derives a candidate transition time 355 from the transition array 350. The specific implementations of various aspects of the data flow diagram 300 shown in FIG. 3 are intended to be illustrative, and should not be considered as limiting. Other implementations can modify the data flow diagram 300 and may still achieve desirable results. For example, embodiments of the multi-level convolutional conversion 330 can include any suitable number of levels (e.g., two, five, etc.), and each level can be configured to output any suitable number of output images 355 of any suitable number and resolution. Similarly, embodiments can iterate in various ways. One implementation converts the output classification array 345 into a two-dimensional image (e.g., where the output of the multi-level convolutional conversion 330 includes 1,560 output pixel values, the output classification array 345 can be converted into a 39-by-40-pixel image), and the two-dimensional image can be run back through the multi-level convolutional conversion 330 (or another multi-level convolutional conversion 330) to generate another output classification array 345. In some cases, selection of certain parameters (e.g., number of levels of the multi-level convolutional conversion 330, iterations, etc.) can impact the amount of training (e.g., the amount of classification training data 235 used for training the auto-classification model 230 and/or the amount of identification training data 255 used for training the auto-identification model 250) involved to achieve a particular level of accuracy in results.

Turning back to FIG. 2, embodiments can include a binge viewing controller 260 to generally control various aspects of interaction between video playback and a human user in a manner that supports a binge watching experience. Embodiments of the binge viewing controller 260 can generate a playback navigation control, responsive to a user interface command, to skip at least a portion of the classified segment in accordance with the transition identification data 245 (e.g., the candidate transition time). In one implementation, the media programming content is a sequence of episodes including a first episode and a second episode following the first episode in the sequence, and the classified segment is an end credits segment of the first episode (i.e., credits rolling at the completion of the first episode). In such an implementation, the binge viewing controller 260 can generate the playback navigation control to be displayed via a user interface responsive to playback of the first episode reaching the candidate transition time, such that, user interaction with the playback navigation control causes playback of the sequence of episodes to skip to the second episode past a remainder of the end credits segment of the first episode. For example, substantially at the same time that the credits begin to roll, the playback interface can change to include a prompt, stating "Skip to next episode?", or the like. Interacting with the prompt (e.g., clicking an appropriate button on a remote control, touchscreen, etc.) can cause playback to skip the remainder of the end credits and skip to the start of the next episode. The playback navigation control can be generated in any suitable manner, for example, at a pop-up, as an overlay, etc. The playback navigation control can also include any suitable information, such as a countdown timer until the next episode will automatically begin.

Implementations having multiple types of segment classifications can support other functionality of the playback navigation control, and/or other permitted behaviors of the playback navigation control. As one example, the playback navigation control can be used in some implementations to skip opening credits and/or recap scenes (e.g., clips from previous episodes shown as a recap), etc. As another example, an embodiment may automatically classify segments of a program as including a segment having the subject portion of the episode, followed by a segment of credits overlaid on a further subject portion of the episode, followed by a segment with credits rolling on a black background, followed by a segment having outtakes from the episode. In such a case, the playback navigation control may permit a user to skip one or more segments (e.g., skip only the segment with credits rolling on a black background), such that the user can watch the segment of credits overlaid on a further subject portion of the episode, and the segment having outtakes from the episode. As another example, in an embodiment that automatically classifies both ending and opening credits of episodes, the playback navigation control may permit a user to navigate from the end of a subject portion of a first episode directly to the beginning of the subject portion of a second episode, skipping both the ending credits of the first episode and the opening credits of the second episode.

Figure 4:
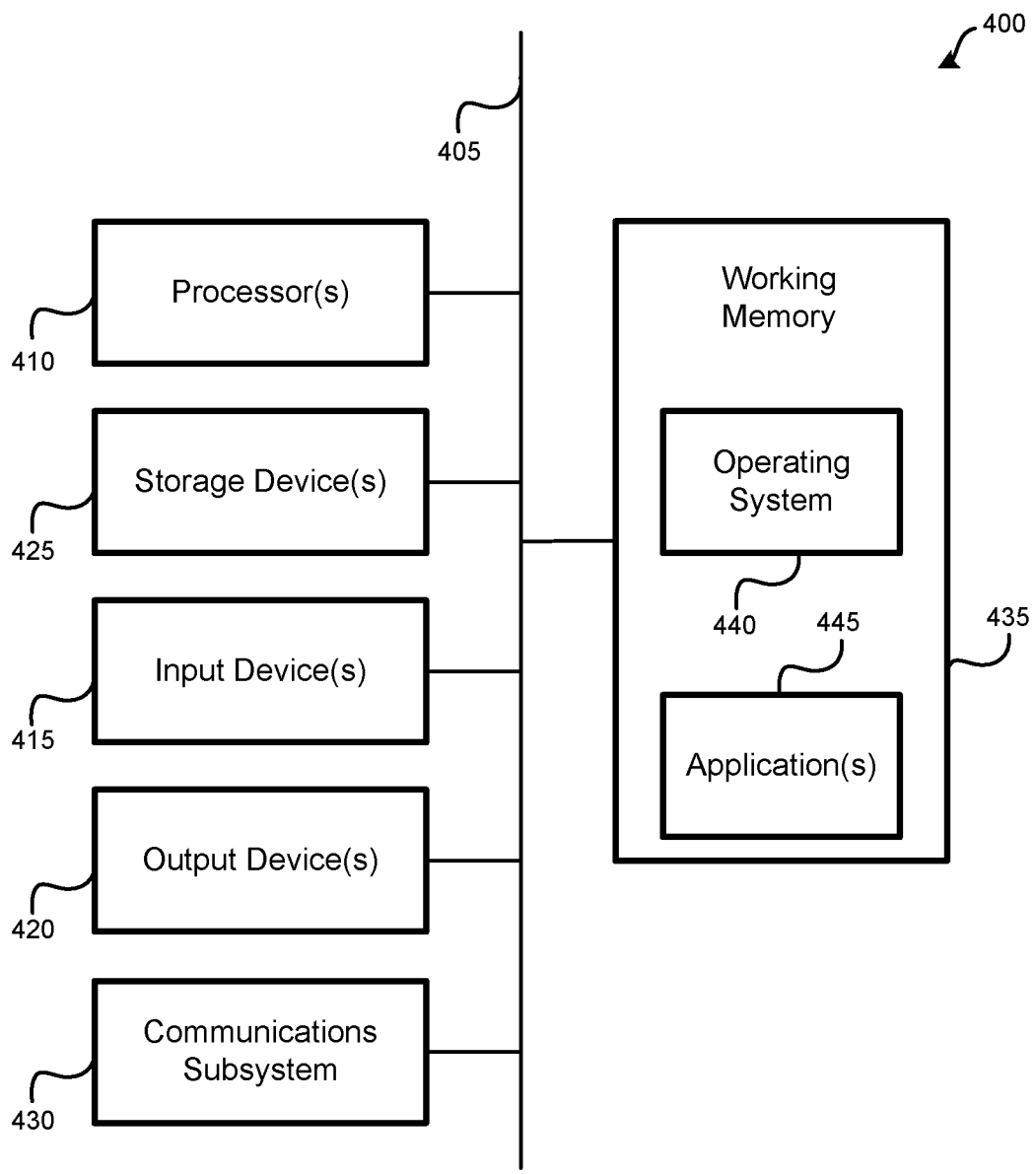
FIG. 4 provides a schematic illustration of one embodiment of a computer system that can implement various system components and/or perform various steps of methods provided by various embodiments described herein.

A computer system as illustrated in FIG. 4 may be incorporated as part of the previously described computerized devices. FIG. 4 provides a schematic illustration of one embodiment of a computer system 400 that can implement various system components and/or perform various steps of methods provided by various embodiments described herein. It should be noted that FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements may include one or more processors 410, including, without limitation, one or more general-purpose processors and/or one or more special-purpose processors (such as digital signal processing chips, graphics acceleration processors, video decoders, and/or the like); one or more input devices 415, which can include, without limitation, a mouse, a keyboard, remote control, and/or the like; and one or more output devices 420, which can include, without limitation, a display device, a printer, and/or the like.

The computer system 400 may further include (and/or be in communication with) one or more non-transitory storage devices 425, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including, without limitation, various file systems, database structures, and/or the like.

The computer system 400 might also include a communications subsystem 430, which can include, without limitation, a modem, a network card (wireless or wired), an infrared communication device, a wireless communication device, and/or a chipset (such as a Bluetooth™ device, an 402.11 device, a WiFi device, a WiMax device, cellular communication device, etc.), and/or the like. The communications subsystem 430 may permit data to be exchanged with a network (such as the network described below, to name one example), other computer systems, and/or any other devices described herein. In many embodiments, the computer system 400 will further comprise a working memory 435, which can include a RAM or ROM device, as described above.

The computer system 400 also can comprise software elements, shown as currently being located within the working memory 435, including an operating system 440, device drivers, executable libraries, and/or other code, such as one or more application programs 445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or codes might be stored on a non-transitory computer-readable storage medium, such as the non-transitory storage device(s) 425 described above. In some cases, the storage medium might be incorporated within a computer system, such as computer system 400. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.), then takes the form of executable code.

As an example, embodiments of the non-transitory computer-readable storage medium include processor-readable instructions that cause one or more processors 410 to perform various steps. The processor(s) 410 can extract N frame images at a sampling rate over an identified candidate segment time window of the media programming content. The processor(s) 410 can then associate each of the N frame images with a respective element of a 1-by-N input classification array. Each element of the input classification array can have an element value indicating a result of automatically classifying the associated frame image into one of multiple predetermined classifications (e.g., including at least a first classification corresponding to the frame image being part of a classified segment, and a second classification corresponding to the frame image not being part of the classified segment). The processor(s) 410 can then convert the input classification array into a two-dimensional input classification image having an input resolution corresponding to N, and a color depth corresponding to the predetermined classifications, such that N input pixel values of the input classification image correspond to the N element values of the classification array. The processor(s) can then compute output classification images as a function of running the input classification image automatically through a multi-level convolutional conversion. For example, the output classification images can include a total of M output pixel values, where M is greater than N. The processor(s) 410 can then serialize the M output pixel values to a 1-by-M output classification array, such that M element values of the output classification array correspond to the M output pixel values of the plurality of output classification images; and can compute a 1-by-N transition array as a function of running the output classification array through an computational neural network trained to compute each of N element values of the transition array as a function of the M element values of the output classification array. The processor(s) can then output a candidate transition time as a function of the transition array, the transition time corresponding to a temporal location at which the media programming content transitions between not being part of the classified segment and being part of the classified segment.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices, such as network input/output devices, may be employed.

As mentioned above, in one aspect, some embodiments may employ a computer system (such as the computer system 400) to perform methods in accordance with various embodiments of the invention. According to a set of embodiments, some or all of the procedures of such methods are performed by the computer system 400 in response to processor 410 executing one or more sequences of one or more instructions (which might be incorporated into the operating system 440 and/or other code, such as an application program 445) contained in the working memory 435. Such instructions may be read into the working memory 435 from another computer-readable medium, such as one or more of the non-transitory storage device(s) 425. Merely by way of example, execution of the sequences of instructions contained in the working memory 435 might cause the processor(s) 410 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 400, various computer-readable media might be involved in providing instructions/code to processor(s) 410 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 425. Volatile media include, without limitation, dynamic memory, such as the working memory 435.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400.

The communications subsystem 430 (and/or components thereof) generally will receive signals, and the bus 405 then might carry the signals (and/or the data, instructions, etc., carried by the signals) to the working memory 435, from which the processor(s) 410 retrieves and executes the instructions. The instructions received by the working memory 435 may optionally be stored on a non-transitory storage device 425 either before or after execution by the processor(s) 410.

It should further be understood that the components of computer system 400 can be distributed across a network. For example, some processing may be performed in one location using a first processor while other processing may be performed by another processor remote from the first processor. Other components of computer system 400 may be similarly distributed. As such, computer system 400 may be interpreted as a distributed computing system that performs processing in multiple locations. In some instances, computer system 400 may be interpreted as a single computing device, such as a distinct laptop, desktop computer, or the like, depending on the context.

Figure 5:
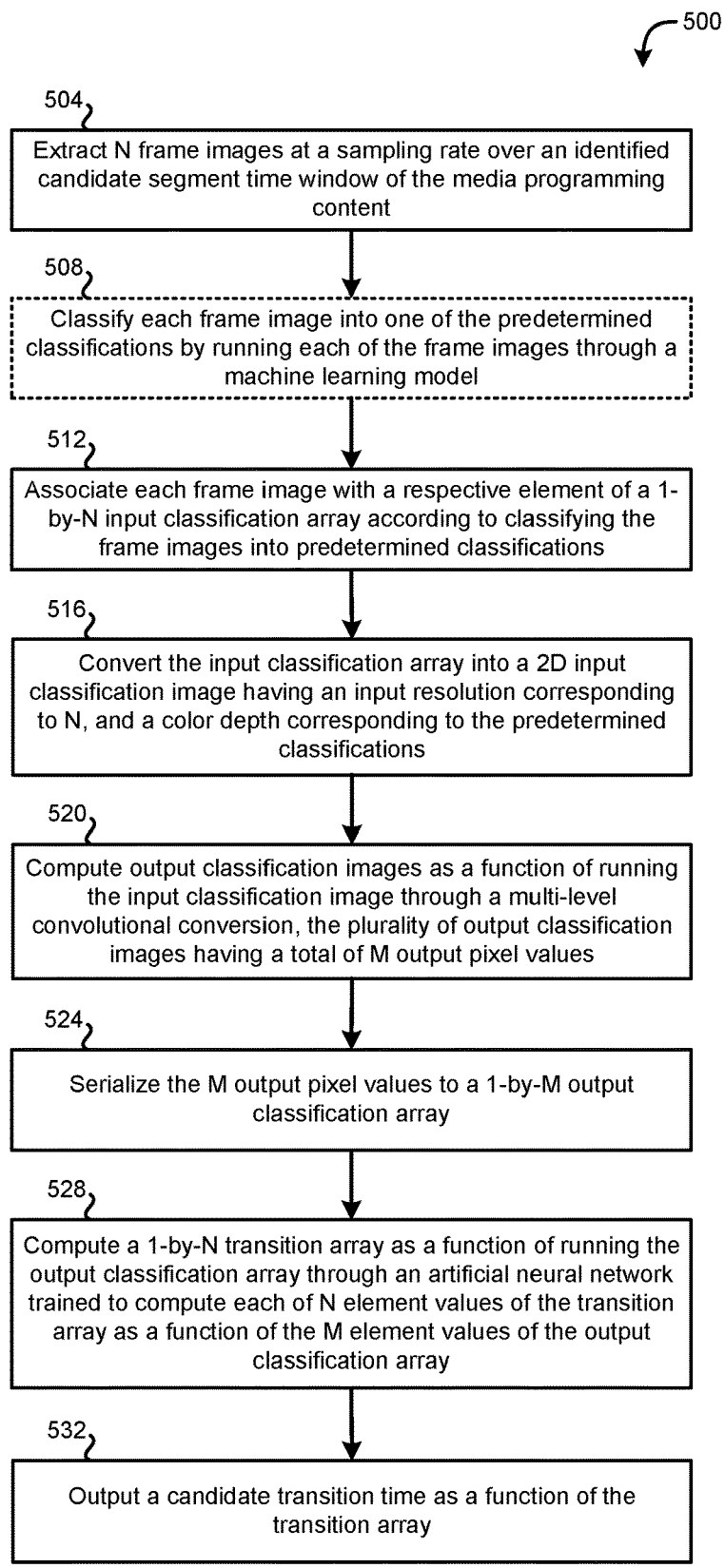
FIG. 5 shows a flow diagram of an illustrative method, according to various embodiments.

Systems including those described above can be used to implement various methods 500. FIG. 5 shows a flow diagram of an illustrative method 500 for automated transition classification of media programming content, according to various embodiments. Embodiments of the method 500 begin at stage 504 by extracting N frame images at a sampling rate over an identified candidate segment time window of the media programming content. In some implementations, the identified candidate segment time window is J minutes long; and the sampling rate is K samples per second, such that N=J*K*60. As an example, the identified candidate segment time window is ten minutes long; and the sampling rate is one sample per second, such that N is 600 frame images. In some implementations, the sampling rate is irregular. For example, the sampling rate may be set to extract 600 samples over a ten-minute window, but the time from one sample to the next may or may not by one second in every instance.

Some embodiments, at stage 508, include automatically classifying each frame image into one of multiple by running each of the frame images through a machine learning model. The machine learning model can be trained as a function of a training set having a large number of training frame images associated with the classified segment, and a large number of training frame images associated with a segment that is not the classified segment. For example, a large number of credit and non-credit frames can be used to train the machine learning model to recognize differences between credit and non-credit frames. In some such implementations, principle component analysis, or the like, is used by a machine to automatically identify which parameters are most useful in discriminating between credit and non-credit frames (or any other suitable classified segment of interest). In some implementations, the machine learning model can be trained to classify images according to only one, or more than one, set of predetermined classifications corresponding to only one, or more than one type of classified segment (e.g., ending credits, opening credits, etc.).

At stage 512, embodiments can associate each of the N frame images automatically with a respective element of a 1-by-N input classification array. Each element of the input classification array can have an element value indicating a result of automatically classifying the associated frame image into one of multiple predetermined classifications (e.g., in stage 508). For example, the predetermined classifications include at least a first classification corresponding to the frame image being part of a classified segment, and a second classification corresponding to the frame image not being part of the classified segment. In some implementations, each element of the input classification array has either a first element value or a second element value (e.g., '1' or '0'), the first element value indicating that the associated frame image is part of the classified segment, and the second element value indicating that the associated frame image is not part of the classified segment. For example, a '1' can indicate that the frame image is classified as an credit frame (e.g., a frame that is part of the end credits of a program), and a '0' can indicate that the frame image is classified as a non-credit frame. In other implementations, more predetermined classifications can be used. For example, '0' can indicate classification as a non-credit frame, '1' can indicate classification as a credit frame with credits overlaid on a single-color (e.g., black) background), and '2' can indicate classification as a credit frame with credits overlaid on other programming in the background.

At stage 516, embodiments can convert the input classification array automatically into a two-dimensional input classification image having an input resolution corresponding to N and a color depth corresponding to the plurality of predetermined classifications. For example, N input pixel values of the input classification image can correspond to the N element values of the classification array. In some implementations, converting the input classification array automatically into the two-dimensional input classification image at stage 516 includes mapping each of the N element values of the classification array to a respective one of the N input pixel values of the input classification image, such that the input classification image has a resolution of B pixels by C pixels, where B*C=N. As an example, the extracting at stage 504 can result in 600 frame images, and the input classification image can be a two-dimensional image of 24-by-25 pixels (24*25=600 pixels). In other implementations, each of the N elements of the input classification array can be mapped to more than one pixel of the input classification image. Each pixel can be colored according to its corresponding element of the input classification array. For example, in implementations having a binary input classification array (i.e., having only two possible values for each element, including a first value corresponding to one classification, and a second value corresponding to another classification), the input classification image can be a two-color (e.g., black and white) image.

At stage 520, embodiments can compute output classification images automatically as a function of running the input classification image through a multi-level convolutional conversion. The resulting output classification images can have a total of M output pixel values, where M is greater than N (i.e., M and N are positive integers, and M>N). In some implementations, the multi-level convolutional conversion includes a number of levels of convolutional conversion. Each level takes the output images from the previous level as its input images, and computes its own output images by applying a set of convolutional filters to its input images. Each level of the convolutional conversion generates a larger number of output images than those computed in the preceding level, and each of the output images has a smaller resolution than the output images computed in the preceding level. Each level can also apply the same or different convolutional filters to generate its output images. The final level of the multi-level convolutional conversion can output some integer number (D) of output classification images, each having a resolution of E pixels by F pixels, such that D*E*F=M. For example, after three levels of convolutional conversion, a 24-by-25-pixel input classification image can be converted into 128 3-by-4-pixel output classification images, such that there are 128*3*4=1563 total output pixel values.

At stage 524, embodiments can serialize the M output pixel values automatically to a 1-by-M output classification array. The serializing can be performed in such a manner that M element values of the output classification array correspond to the M output pixel values of the plurality of output classification images. As an example, each pixel of each output classification image is mapped, according to a predefined sequence, to a corresponding element of the output classification array.

At stage 528, embodiments can compute a 1-by-N transition array automatically as a function of running the output classification array through an computational neural network trained to compute each of N element values of the transition array as a function of the M element values of the output classification array. Embodiments of the computational neural network are trained to compute an M-by-N set of weightings. According to such embodiments, computing the transition array includes applying the M-by-N weightings to the 1-by-M output classification array to compute the 1-by-N transition array. For example, the output classification array can be represented as a 1-by-M matrix, the M-by-N weightings can be represented as an M-by-N matrix, and multiplying the 1-by-M matrix by the M-by-N matrix can yield a 1-by-N matrix corresponding to (e.g., equaling, or from which to derive) the 1-by-N transition array.

At stage 532, embodiments can output a candidate transition time as a function of the transition array. The candidate transition time corresponds to a temporal location at which the media programming content transitions between not being part of the classified segment and being part of the classified segment. In some implementations, the computational neural network is configured to output the transition array, such that each of the N element values of the transition array corresponds to a respective one of the N frame images; only one of the N element values of the transition array has a first transition element value (e.g., '1') indicating a transition frame; and each of the other (i.e., N−1) element values of the transition array have a second transition element value (e.g., '0') indicating a non-transition frame. In such implementations, outputting the candidate transition time as a function of the transition array includes identifying one frame image of the N frame images as corresponding to the one of the N element values of the transition array comprising the first transition element value. In some implementations, outputting the candidate transition time at stage 532 further includes identifying the temporal location by mapping the identified one frame image to the temporal location in the media programming content. For example, the identified frame image can correspond to a particular time stamp that is a number of tenths of a second from the start of the program (or any other suitable temporal measure).

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for automated transition classification of media programming content, the method comprising:
generating an input classification image by assigning each of N pixels of the input classification image to a respective frame image of N frame images extracted from a portion of media programming content, and assigning to each of the N pixels a respective pixel value indicating at least whether the respective frame image is classified as part of a classified segment of the media programming content;
first computing M element values of an output classification array automatically as a function of running the input classification image through a multi-level convolutional conversion; and
second computing a transition array automatically as a function of running the output classification array through a computational neural network trained to compute each of N element values of the transition array as a function of the M element values of the output classification array, such that the transition array indicates a temporal location at which the media programming content transitions between not being part of the classified segment and being part of the classified segment.

2. The method of claim 1, further comprising:
outputting the temporal location.

3. The method of claim 1, wherein:
the transition array indicates a transition frame at which the media programming content transitions between not being part of the classified segment and being part of the classified segment, the transition frame corresponding to one of the N image frames; and
the second computing comprises mapping the transition frame to the temporal location in the media programming content, the temporal location corresponding to a time stamp and/or a frame index in the media programming content.

4. The method of claim 1, wherein:
the assigning to each of the N pixels the respective pixel value comprises computing the respective pixel value as a function of applying an auto-classification model to the respective frame image, such that the respective pixel value corresponds to one of a plurality of predetermined classifications determinable by the machine-implemented auto-classification model.

5. The method of claim 4, wherein:
the machine-implemented auto-classification model is a machine learning model trained as a function of classification training data comprising first training frames associated with the classified segment and second training frames not associated with the classified segment.

6. The method of claim 1, wherein:
each respective pixel value indicates one of a number of predetermined classifications including whether the respective frame image is classified as part of the classified segment; and
generating the input classification image comprises generating a two-dimensional image having a resolution of at least N image pixels and a color depth corresponding to at least the number of predetermined classifications.

7. The method of claim 1, wherein the generating comprises:
identifying a candidate time window of the media programming content previously predicted to include a transition to or from the classified segment; and
extracting the N frame images at a sampling rate over the identified candidate segment time window.

8. The method of claim 7, wherein the sampling rate is an irregular sampling rate.

9. The method of claim 1, wherein the first computing comprises:
running the input classification image through the multi-level convolutional conversion to compute a plurality of output classification images having a total of M output pixel values, M being greater than N, each of the M element values of the output classification array corresponding to a respective one of the M output pixel values of the plurality of output classification images.

10. The method of claim 9, wherein:
the multi-level convolutional conversion comprises a sequence of J convolutional conversions, each jth convolutional conversion computing a jth plurality of output images as a function of applying a jth plurality of convolutional filters to a jth set of input images; for each jth convolutional conversion, the jth plurality of output images being of a respective number larger than that of the jth set of input images, and the jth plurality of output images each being of a respective resolution smaller than that of the jth set of input images;
for j=1, the jth set of input images is the input classification image; and
for each j greater than 1, the jth set of input images is the (j−1)th set of output images.

11. The method of claim 10, wherein:
for j=J, the jth set of output images is the plurality of output classification images computed, such that the respective number jth set of output images multiplied by the respective resolution of each of the jth set of output images equals M.

12. The method of claim 1, wherein:
the first computing comprises iteratively computing the M element values of the output classification array by:
in a first iteration, running the input classification image through the multi-level convolutional conversion to generate the output classification array; and
in each of at least one subsequent iteration, converting the output classification array to an output classification array image, and running the output classification array image through the multi-level convolutional conversion to re-generate the output classification array.

13. The method of claim 1, wherein:
the second computing is such that one of the N element values of the transition array indicates a respective one of the N frame images as a transition frame, and each of another N 1 of the N element values indicates another respective one of the N frame images as a non-transition frame.

14. A system for automated transition classification of media programming content, the system comprising:
one or more processors; and
a non-transient, machine-readable medium coupled with the one or more processors and having, stored thereon, instructions, which, when executed, cause the one or more processors to perform steps comprising:
generating an input classification image by assigning each of N pixels of the input classification image to a respective frame image of N frame images extracted from a portion of media programming content, and assigning to each of the N pixels a respective pixel value indicating at least whether the respective frame image is classified as part of a classified segment of the media programming content;
first computing M element values of an output classification array automatically as a function of running the input classification image through a multi-level convolutional conversion; and
second computing a transition array automatically as a function of running the output classification array through a computational neural network trained to compute each of N element values of the transition array as a function of the M element values of the output classification array, such that the transition array indicates a temporal location at which the media programming content transitions between not being part of the classified segment and being part of the classified segment.

15. The system of claim 14, wherein the instructions, when executed, cause the one or more processors to perform steps further comprising:

outputting the temporal location.

16. The system of claim 14, wherein:
the transition array indicates a transition frame at which the media programming content transitions between not being part of the classified segment and being part of the classified segment, the transition frame corresponding to one of the N image frames; and
the second computing comprises mapping the transition frame to the temporal location in the media programming content, the temporal location corresponding to a time stamp and/or a frame index in the media programming content.

17. The system of claim 14, wherein:
the assigning to each of the N pixels the respective pixel value comprises computing the respective pixel value as a function of applying an auto-classification model to the respective frame image, such that the respective pixel value corresponds to one of a plurality of predetermined classifications determinable by the machine-implemented auto-classification model.

18. The system of claim 14, wherein:
each respective pixel value indicates one of a number of predetermined classifications including whether the respective frame image is classified as part of the classified segment; and
generating the input classification image comprises generating a two-dimensional image having a resolution of at least N image pixels and a color depth corresponding to at least the number of predetermined classifications.

19. The system of claim 14, wherein the first computing comprises:
running the input classification image through the multi-level convolutional conversion to compute a plurality of output classification images having a total of M output pixel values, M being greater than N, each of the M element values of the output classification array corresponding to a respective one of the M output pixel values of the plurality of output classification images.

20. The system of claim 19, wherein:
the multi-level convolutional conversion comprises a sequence of J convolutional conversions, each jth convolutional conversion computing a jth plurality of output images as a function of applying a jth plurality of convolutional filters to a jth set of input images;
for each jth convolutional conversion, the jth plurality of output images being of a respective number larger than that of the jth set of input images, and the jth plurality of output images each being of a respective resolution smaller than that of the jth set of input images;
for j=1, the jth set of input images is the input classification image; and
for each j greater than 1, the jth set of input images is the (j−1)th set of output images.

* * * * *